United States Patent [19]

Xie et al.

[11] Patent Number: 5,606,254

[45] Date of Patent: Feb. 25, 1997

[54] ROTATION SENSOR EMPLOYING COIL WOUND ON ASSEMBLY OF A CORE INTERPOSED BETWEEN TWO MAGNETS

[75] Inventors: Jinqiang Xie, Anderson, Ind.; Denise A. Quinnette, El Paso, Tex.

[73] Assignee: General Motors Corporation, Detroit, Mich.

[21] Appl. No.: 545,458

[22] Filed: Oct. 19, 1995

[51] Int. Cl.$^6$ .................................................. G01P 3/488
[52] U.S. Cl. ...................... 324/174; 310/168; 324/207.15
[58] Field of Search ..................................... 324/173, 174, 324/207.15, 207.25; 310/155, 168; 188/181 R, 181 A, 181 C

[56] References Cited

U.S. PATENT DOCUMENTS

| 3,961,214 | 6/1976 | Lokkart | 324/174 X |
|---|---|---|---|
| 3,986,118 | 10/1976 | Madigan | 324/174 |
| 4,045,738 | 8/1977 | Buzzell | 324/174 |
| 4,200,816 | 4/1989 | Hopkins | 310/168 |
| 4,215,286 | 7/1980 | Ornee | 310/155 |
| 4,626,781 | 12/1986 | Forkel | 324/174 |
| 4,721,864 | 1/1988 | Goossens | 307/106 |
| 4,922,197 | 5/1990 | Juds et al. | 324/174 X |
| 5,023,547 | 6/1991 | Pawlak et al. | 324/174 |
| 5,508,608 | 4/1996 | Goosens | 324/207.25 X |
| 5,510,708 | 4/1996 | Shirai et al. | 324/174 |

FOREIGN PATENT DOCUMENTS

| 3927007 | 2/1991 | Germany | 324/174 |
|---|---|---|---|
| 74929 | 3/1992 | Japan | 324/174 |

*Primary Examiner*—Gerard R. Strecker
*Attorney, Agent, or Firm*—Howard N. Conkey

[57] ABSTRACT

A variable reluctance sensor for sensing the rotational speed of a target wheel having teeth, separated by slots, angularly positioned along its periphery is comprised of an elongated core interposed between two permanent magnets which generate additive magnetic flux passing longitudinally through the elongated core. This additive flux is, however, opposed by a longitudinal flux developed by the opposing ends of the permanent magnets. In the absence of surrounding ferromagnetic material, the magnitudes of the opposing longitudinal flux components are essentially equal, resulting in no net longitudinal component of magnetic flux. The elongated core and permanent magnets are encircled by a multi-turn electrical coil which is wound transversely about a longitudinal dimension. A portion of the elongated core and permanent magnets extending beyond the electrical coil are positioned adjacent the periphery of the target wheel and define an air gap therebetween. As the target wheel rotates, the air gap varies, which in turn varies the magnitudes of the opposing longitudinal components of magnetic flux with respect to one another. An output voltage is generated in the electrical coil having an amplitude proportional to the rate of change of the net longitudinal flux magnitude and a frequency proportional to the rotational speed of the target wheel.

3 Claims, 3 Drawing Sheets

ROTATION SENSOR EMPLOYING COIL WOUND ON ASSEMBLY OF A CORE INTERPOSED BETWEEN TWO MAGNETS

The present invention relates to a variable reluctance rotation sensor which generates a high output voltage signal despite low rotational speeds or large air gaps. Such a sensor would find particular utility in a vehicle anti-lock braking or traction control system for detecting rotational wheel speed.

BACKGROUND OF THE INVENTION

Typical prior art variable reluctance rotation sensors are positioned adjacent a rotatable ferromagnetic target wheel having teeth separated by slots along its periphery. The target wheel is coupled to and rotated by a rotating shaft, the rotational speed and/or position of which is desired. These variable reluctance sensors generally comprise a permanent magnet attached to one end of an elongated core made of soft magnetic material, about which is wound an electrical coil, which projects outwardly from the magnet away from the target wheel. The permanent magnet and target wheel periphery define an air gap which varies as the target wheel rotates. The air gap is at a minimum when the sensor is directly adjacent a "tooth," and at a maximum when directly adjacent a "slot."

The permanent magnet produces a magnetic field which drives flux across the air gap, through a portion of the target wheel, back across the air gap, through the electrical coil, into the elongated core and back to the permanent magnet. As the target wheel rotates, the varying air gap varies the reluctance of the flux path, which in turn varies the flux magnitude passing through the elongated core. This varying flux produces an AC voltage in the electrical coil having an amplitude proportional to the rate of change of flux and a frequency proportional to the rotational speed of the target wheel.

The objective is to obtain a voltage output signal having a peak- to-peak amplitude sufficiently large for easy sensing and signal processing, while at the same time minimizing the size of the permanent magnet and the associated magnetic path in order to permit the manufacture of small, compact sensors. The peak-to-peak amplitude of the voltage is dependent upon the strength of the permanent magnet (i.e., amount of magnetic flux it generates), the size of the air gap, the number of turns in the electrical coil, and the rotational speed of the target wheel.

Modern anti-lock braking and traction control systems require incorporation of rotational sensors in vehicle wheel bearings for detection of wheel rotation. Due to packaging constraints, attempting to increase the output voltage by increasing the number of coil turns necessitates using smaller wire, which is more prone to breakage during manufacture of the sensor and operation of the vehicle. Packaging constraints also limit the size of the permanent magnet, which can necessitate the use of expensive, high strength rare earth permanent magnets to drive enough flux across the air gap and through the elongated core to achieve the required output voltage.

Air gap variations between the sensor and target wheel also have a significant affect upon the output voltage. The closer the sensor is placed to the periphery of the target wheel, the greater the peak-to-peak amplitude of the output voltage signal. Accordingly, the larger the minimum air gap, the lower the peak-to-peak amplitude of the output voltage signal. Unfortunately, manufacturing and assembly variations may result in large minimum air gaps, lowering the voltage output.

Additionally, the peak-to-peak amplitude of the voltage output decreases with the rotational speed of the target wheel since the rate of change of the flux due to air gap differences decreases as the teeth move more slowly past the sensor.

In light of the aforementioned, small, inexpensive, durable variable reluctance rotation sensors generating high output voltages in the presence of low rotational speeds and/or large air gaps are not readily available.

SUMMARY OF THE PRESENT INVENTION

The present invention is directed to a small, inexpensive, durable variable reluctance rotation sensor which generates an extremely high output voltage despite low rotational speeds and/or large air gaps, and therefore provides an improved rotational speed signal over those of the prior art.

According to the present invention, an elongated core made of soft magnetic material is interposed between two elongated permanent magnets which are arranged in magnetic opposition to one another. The elongated core and two permanent magnets have substantially similar longitudinal dimensions such that the longitudinal dimension of the pole piece is entirely interposed between the two permanent magnets.

A multi-turn electrical coil is wound about the core and magnets transversely along a longitudinal direction. A portion of the core and magnets extend beyond the electrical coil, this portion being positioned adjacent a rotatable target wheel having teeth separated by slots angularly positioned along its periphery. The sensor and target wheel periphery define an air gap which varies as the target wheel rotates. The orientation of the sensor adjacent the target wheel periphery can be such that the longitudinal direction of the sensor is either perpendicular or parallel to the rotational axis of the target wheel.

Whereas in prior art sensors the magnetic flux generated by the permanent magnet has a component which generally passes longitudinally through the elongated core at all times, only its magnitude varying as the target wheel rotates, a net longitudinal component of magnetic flux generated by the permanent magnets of the sensor of the present invention passing through the elongated core will vary between a magnitude of "zero" and "some value" as function of the angular position of the target wheel.

As the target wheel rotates, teeth and slots alternately pass adjacent the sensor. When a slot is adjacent the sensor, the magnetic reluctance of the air gap is high, resulting in no net longitudinal component of flux. When a tooth is adjacent the sensor, the magnetic reluctance of the air gap is drastically reduced, resulting in an increase in the amount of magnetic flux produced by the portion of the permanent magnets nearest the tooth, and a concentration of that flux through the elongated core. When this occurs, a net longitudinal component of flux will pass through the elongated core.

A voltage will develop in the electrical coil proportional to the change in magnitude of longitudinal flux passing through the elongated core. The voltage will have a magnitude proportional to the rate of change of magnetic flux passing longitudinally through the elongated core, and a frequency proportional to the rotational speed of the target wheel.

The change in the longitudinal component of flux between "zero" and "some value" as the target wheel rotates provides for a large peak-to-peak amplitude of the voltage signal, while enabling easy detection and accurate processing.

The sensor configuration of the present invention generates a significantly higher voltage output than prior art sensors. It enables the use of (i) less expensive permanent magnets, and (ii) electrical coils formed of larger, more robust wire of fewer turns, while maintaining a sufficiently high output voltage signal despite the presence of low rotational speeds or large air gaps.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

In the description that follows, similar parts or structures used in the figures will be designated with like numerals, and where such parts and structures have been previously discussed with respect to an earlier figure, the description will not be repeated.

Figure 1:
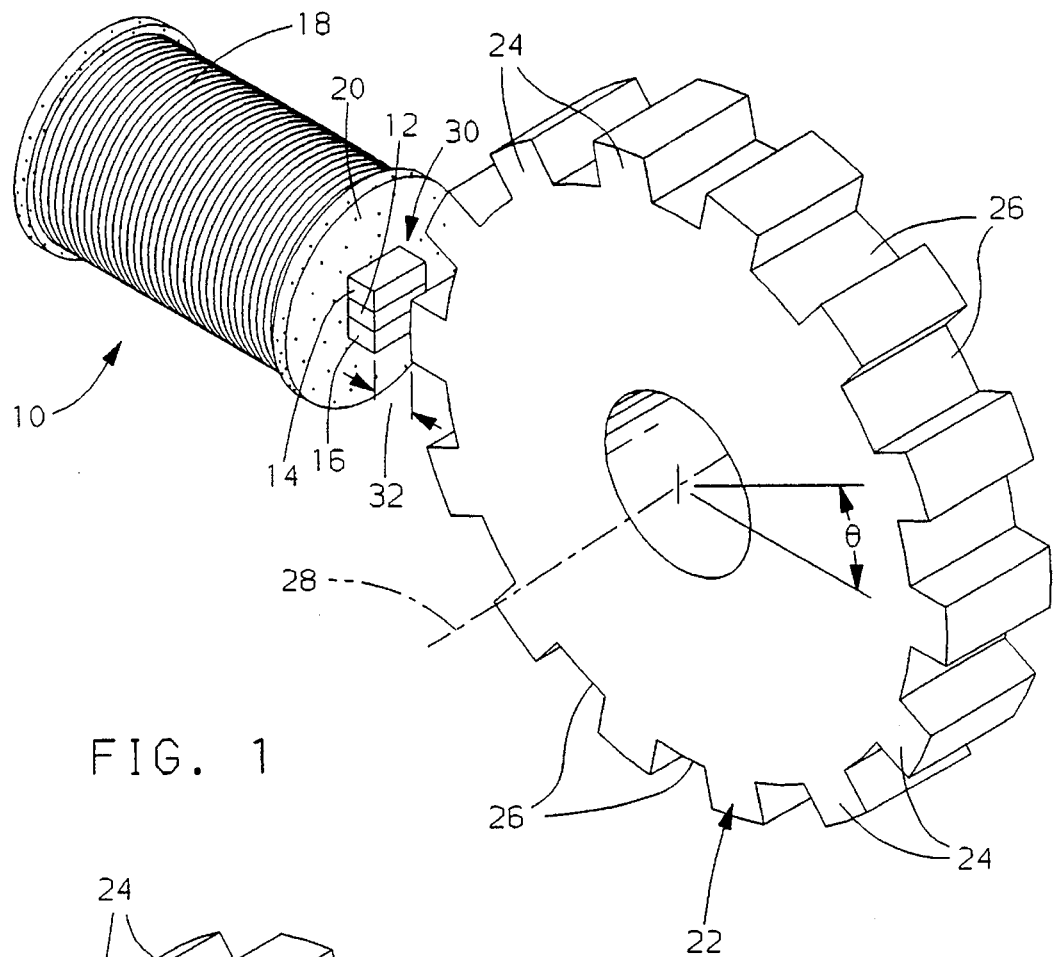
FIG. 1 illustrates a perspective view of a sensor constructed in accordance with the present invention, and aligned in a first orientation with respect to a target wheel.
Figure 3:
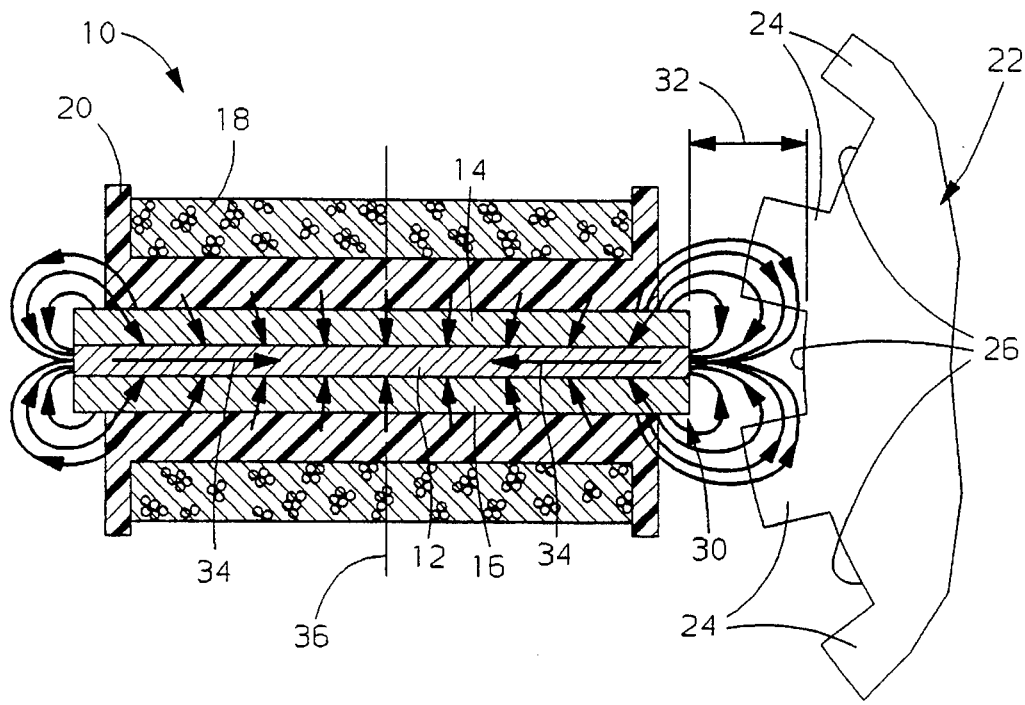
FIG. 3 illustrates magnetic flux paths for a sensor of the present invention adjacent a slot on the target wheel.
Figure 4:
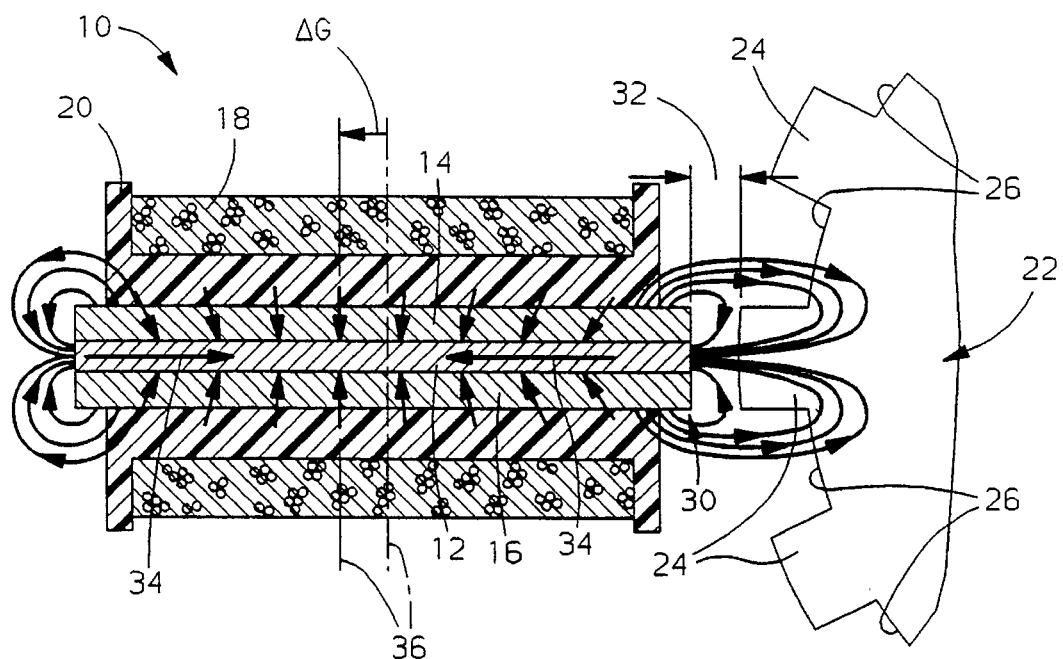
FIG. 4 illustrates magnetic flux paths for a sensor of the present invention adjacent a tooth on the target wheel.

Referring to the drawings, and more particularly to FIG. 1, reference numeral 10 generally refers to a sensor constructed in accordance with the present invention, shown here in perspective. The sensor 10 comprises an elongated core 12 formed of soft magnetic material interposed between two elongated permanent magnets 14 and 16 along its entire length. Each magnet 14 and 16 is magnetized such that the surface of each magnet adjacent the core 12 comprises one pole of the magnet as illustrated in FIGS. 3 and 4. In other words, the magnetic axis of each magnet 14 and 16 lies in the direction of its thickness. The two permanent magnets 14 and 16 are arranged such that they are magnetically opposed with respect to one another. In FIG. 1, the S-poles of the permanent magnets are opposing one another; however, their magnetic polarities can be reversed such that their N-poles are opposing.

The elongated core 12 and two permanent magnets 14 and 16 are partially encircled by a multi-turn electrical coil 18 which is wound about a bobbin 20 transversely to a longitudinal dimension of the elongated core 12 and two permanent magnets 14 and 16. The elongated core 12 and two permanent magnets 14 and 16 are of similar length such that they protrude equally from the electrical coil 18. This protruding portion, referred generally by reference numeral 30, is positioned adjacent to a target wheel 22 having teeth 24 separated by slots 26 along its periphery. The target wheel can be attached to or integrally formed as part of such vehicle rotational parts as a wheel axle, transmission shaft, crankshaft or camshaft.

The protruding portion 30 and target wheel 22 define an air gap 32 which varies as the target wheel 22 rotates about a rotational axis 28. The air gap is at a maximum when a slot 26 is adjacent the protruding portion 30, and is at a minimum when a tooth 24 is adjacent the protruding portion 30.

Figure 2:
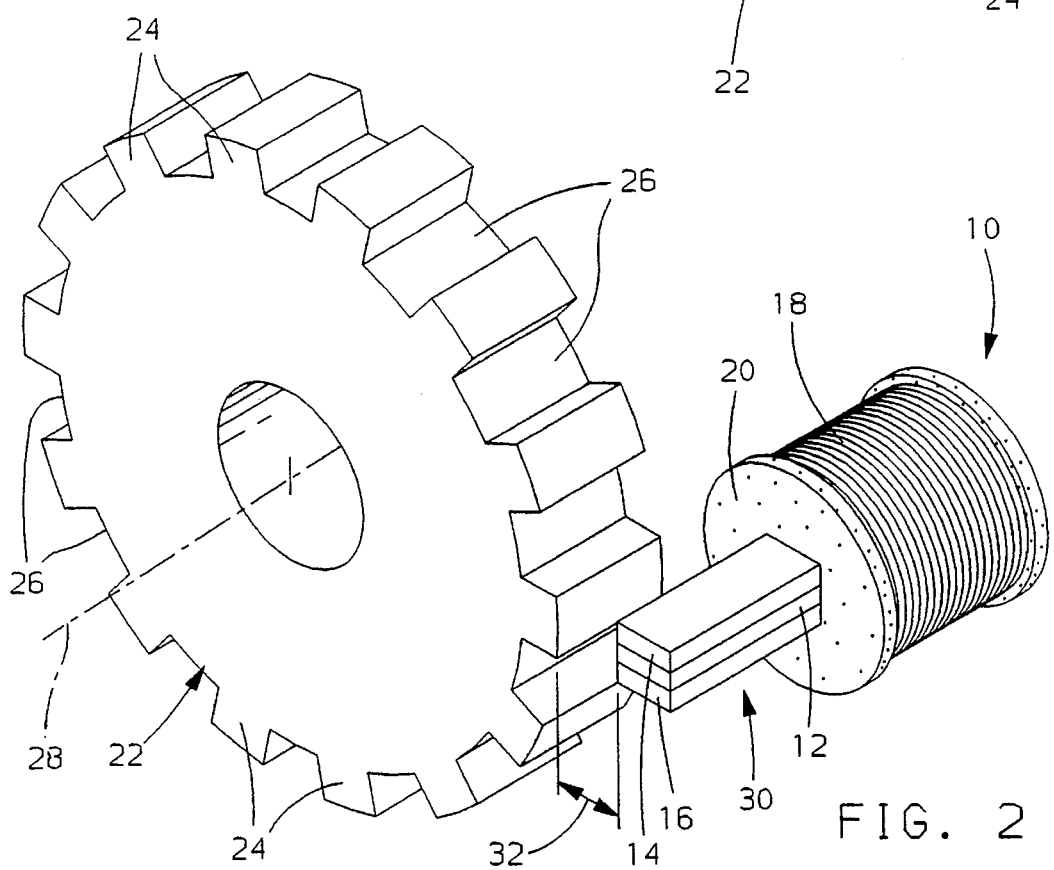
FIG. 2 illustrates a perspective view of a sensor constructed in accordance with the present invention, and aligned in a second orientation with respect to a target wheel.

In the preferred embodiment of FIG. 1, the protruding portion 30 is aligned adjacent the periphery of the target wheel 22 such that the sensor 10 projects longitudinally outward from the target wheel 22, perpendicular to its rotational axis 28. Alternatively, as illustrated in FIG. 2, the protruding portion 30 can be aligned adjacent the periphery of the target wheel 22 such that the sensor 10 projects longitudinally along the width of the target wheel 22, parallel to its rotational axis 28. Depending upon the width of the target wheel 22, a longer protruding portion 30 may be necessary to allow for sufficient clearance between the teeth 24 and bobbin 20.

Referring back to FIG. 1, the two permanent magnets 14 and 16 generate magnetic fields which drive flux both transversally and longitudinally through the elongated core 12. The magnetically-opposing orientation of the two permanent magnets 14 and 16 operate so as to have an additive effect as to the magnetic flux generated by each permanent magnet 14 and 16. That is, the magnetic flux developed by each of the permanent magnets 14 and 16 passing transversally and longitudinally through the elongated core 12 aid that generated by the other. However, the longitudinal components of magnetic flux developed by opposing ends of each one of the permanent magnets 14 and 16 oppose one another, as will be described in further detail below.

The magnetic flux paths generated by the preferred embodiment of FIG. 1 are illustrated in FIGS. 3 and 4. FIG. 3 illustrates the magnetic flux paths generated by the sensor 10 when aligned adjacent a slot 26 on the target wheel 22, the larger air gap providing a high reluctance path between the elongated core 12 and target wheel 22. FIG. 4 illustrates the magnetic flux paths generated by the sensor 10 when aligned adjacent a tooth 24 on the target wheel 22, providing a low reluctance path between the elongated core 12 and target wheel 22.

Referring to FIG. 3, the two permanent magnets 14 and 16 generate magnetic fields which drive flux through the elongated core 12. For purposes of analysis, at any point along the elongated core, the magnetic flux path can be broken into transversal and longitudinal components. In the presence of a low reluctance path between the elongated core 12 and target wheel 22, as with the arrangement of FIG. 3, the flux paths are normally as shown, with the flux passing through the elongated core 12 in substantially a transversal direction, with only a minor longitudinal component 34 resulting mainly from fringing flux existing at the ends of the permanent magnets 14 and 16. Note that the longitudinal component 34 of magnetic flux developed by common ends of each of the permanent magnets 14 and 16 are additive. Note further, however, that this additive flux is opposed by an additive flux in an opposing longitudinal direction through the elongated core 12 developed at the opposing end of each permanent magnet 14 and 16. The relative magnitudes of the two additive longitudinal components is dependent upon the presence of surrounding ferromagnetic material, that is, the angular position of the target wheel 22.

Soft magnetic (ferromagnetic) material acts as a flux shorting mechanism, diverting flux from its otherwise natural path. Also, the closer a permanent magnet is to ferromagnetic material, the greater the amount of magnetic flux it produces. The target wheel 22 of FIG. 3 is comprised of soft magnetic material. Its affect upon the flux paths of the two permanent magnets 14 and 16 through the elongated core 12 will depend upon the reluctance of the air gap 32 between them. When the angular position of the target wheel 22 is such that a slot 26 is aligned adjacent the protruding portion 30, the air gap is at a maximum, with a correspondingly high reluctance. This reluctance is sufficiently high so that the target wheel will have little to no net affect upon the flux developed by the permanent magnets 14 and 16.

The symmetrical configuration of the permanent magnets and core of the sensor of FIG. 3 will result in no "net" longitudinal component of magnetic flux. That is, the "zero Gauss line" 36 will be essentially at the midpoint of the elongated core 12.

Conversely, referring to FIG. 4, if the angular position of the target wheel 22 is such that a tooth 24 is positioned adjacent the protruding portion 30, the air gap 32 is at a minimum, with a significantly reduced reluctance. As a result, the presence of the soft magnetic target wheel 22 will result in an increase of flux generated by the portions of permanent magnets 14 and 16 closest to the target wheel 22. A portion of this flux is diverted across the air gap 32, through portions of the target wheel 22, back across the air gap 32 and concentrated along a longitudinal path through the elongated core 12. Consequently, the relative magnitudes of the opposing longitudinal components 34 will be unequal, resulting in a net longitudinal component of magnetic flux passing through the elongated core 12 and a corresponding shift ΔG of the zero Gauss line 36.

In accordance with well-known magnetic principles, an electrical coil will generate an output voltage in response to a change in magnetic flux passing axially through its coil turns. In this case, flux passing longitudinally through the elongated core 12 passes axially through the electrical coil 18 and will contribute to the development of a voltage in the electrical coil 18; however, flux passing transversely through the elongated core 12 does not pass axially through the electrical coil 18, and will not contribute to the development of a voltage in the electrical coil 18.

Figure 5:
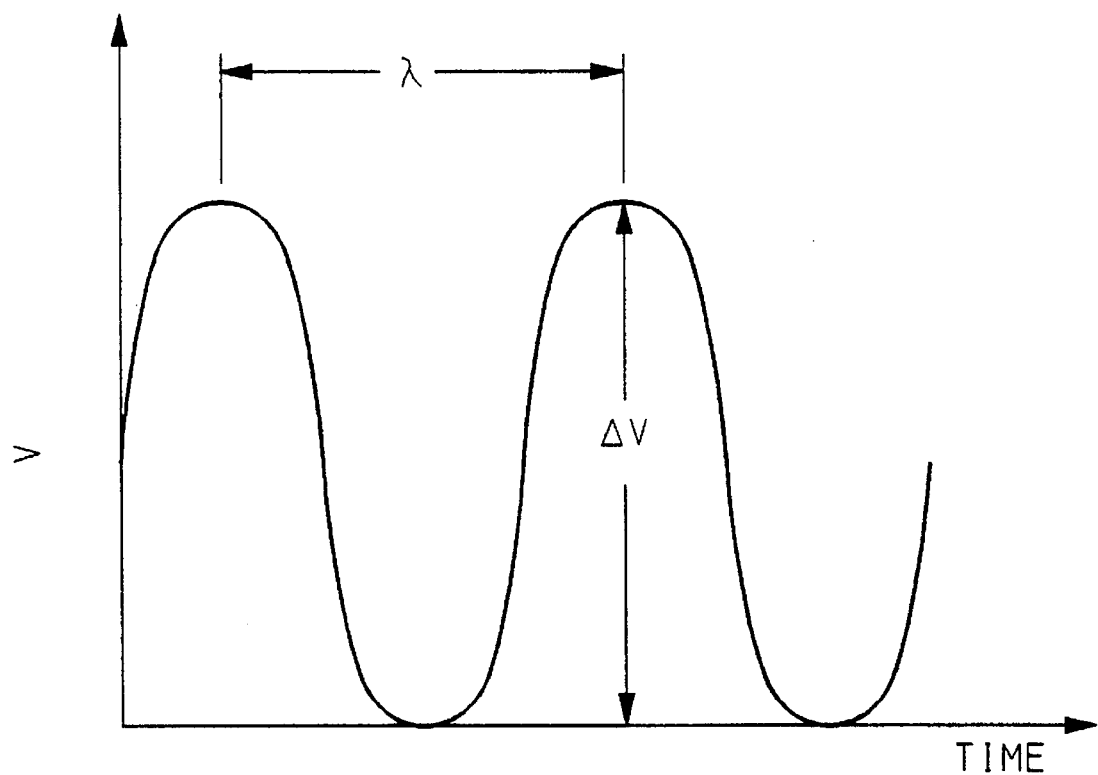
FIG. 5 illustrates an output voltage signal of a sensor of the present invention.

Accordingly, referring to FIG. 5, as the target wheel 22 rotates, the electrical coil 18 will develop an output voltage signal having a voltage V which varies over time with an amplitude proportional to the rate of change of the magnetic flux passing longitudinally through the elongated core 12 and a frequency proportional to the rotational speed of the target wheel 22. Each period λ of the voltage signal corresponds to rotation of the target wheel 22 by an incremental number of angular degrees θ. The voltage signal is processed by appropriate circuitry for determining the rotational speed and/or angular position of the target wheel for operational use by such vehicle systems as traction control and anti-lock braking.

The peak-to-peak voltage amplitude ΔV is a function of the change in flux passing longitudinally through the elongated core 12. The change in flux of prior art sensors was generally between two "non-zero" flux levels, resulting in two "non-zero" voltage levels. Typically, electrical signal processing of the output voltage signal comprised comparing the voltage levels with a predetermined threshold voltage, all voltages above the threshold voltage corresponded to an adjacent tooth 24, and all voltages less than the threshold voltage corresponded to an adjacent slot 26. For this reason, the greater the peak-to-peak amplitude ΔV of the voltage signal, the easier and more accurate is the processing of the signal. Unfortunately, varying air gaps from one sensor/target wheel assembly to another due to manufacturing tolerances resulted in varying voltage levels between units, which made selection of a predetermined threshold voltage extremely difficult.

The sensor of the present invention improves upon the prior art by having a change in flux between a "zero" and "non-zero" flux level, resulting in an output voltage signal which varies between substantially 0 V and some "non-zero" voltage level. This makes for much easier selection of a predetermined threshold voltage since despite air gap variations due to manufacturing and assembly tolerances, the minimum voltage signal will always be substantially 0 V.

The configuration of the sensor of the present invention substantially improves the output available from prior art sensors by interposing an elongated core 12 between two magnetically-opposing permanent magnets 14 and 16, and winding an electrical coil 18 transversely about a portion of the elongated core 12 and permanent magnets 14 and 16 along a longitudinal dimension. This structure enables the use of less expensive permanent magnets and electrical coils formed of larger wire and fewer turns, while maintaining a sufficiently high output voltage signal, even in the presence of low rotational speeds and large air gaps.

While the present invention has been described in reference to the illustrated embodiments, it will be recognized that various modifications will occur to those skilled in the art. In this regard, it will be understood that the systems incorporating such modifications may fall within the scope of this invention, which is defined by the appended claims.

The embodiments of this invention in which an exclusive property or privilege is claimed are defined as follows:

1. A variable reluctance rotation sensor for detecting rotation of a target wheel formed of soft magnetic material and having teeth, separated by slots, angularly spaced along its periphery, the sensor comprising:

an elongated core formed of soft magnetic material;

two elongated permanent magnets positioned in magnetic opposition to one another and between which is interposed the elongated core, each of the two permanent magnets generating a magnetic flux having a component of which passes longitudinally through the elongated core in a direction (i) aiding that generated at a common end of the other of the two permanent magnets, and (ii) opposing that generated at an opposing end of either of the two permanent magnets; and an electrical coil wound transversely to a longitudinal dimension about the elongated core and two permanent magnets, the elongated core and two permanent magnets having a first end protruding from the electrical coil and positioned adjacent the target wheel periphery, wherein (i) when the angular position of the target wheel aligns a slot adjacent the first end, the magnitudes of the longitudinal components of magnetic flux generated by opposing ends of each of the permanent magnets are substantially equal, resulting in no net magnetic flux passing longitudinally through the elongated core, and (ii) when the angular position of the target wheel aligns a tooth adjacent the first end, the magnitudes of the longitudinal components of magnetic flux generated by opposing ends of each of the two permanent magnets are unequal, resulting in a net magnetic flux passing longitudinally through the elongated core with a corresponding voltage being developed in the electrical coil having an amplitude proportional to a rate of change of the longitudinal component of magnetic flux and a frequency proportional to the rotational speed of the target wheel.

2. The variable reluctance rotation sensor according to claim 1, wherein the first end is positioned adjacent the periphery of the target wheel such that its longitudinal dimension is one of perpendicular and parallel to the rotational axis of the target wheel.

3. The variable reluctance rotation sensor according to claim 1, wherein the elongated core and two permanent magnets are comprised of similar longitudinal dimensions.

* * * * *